United States Patent
O'Loughlin et al.

(10) Patent No.: US 7,908,311 B2
(45) Date of Patent: Mar. 15, 2011

(54) SYSTEM AND METHOD FOR PROVIDING A DISTRIBUTED WORKFLOW THROUGH A PLURALITY OF HANDHELD DEVICES

(75) Inventors: Keith O'Loughlin, Maynooth (IE); David Harrison, Maynooth (IE); Niall Darby, Blackrock (IE); Padraig Cummins, Dalkey (IE); Lorraine Moore, Dublin (IE)

(73) Assignee: Intuition Publishing Limited, Dublin (IE)

( * ) Notice: Subject to any disclaimer, the term of this patent is extended or adjusted under 35 U.S.C. 154(b) by 399 days.

(21) Appl. No.: 11/831,054

(22) Filed: Jul. 31, 2007

(65) Prior Publication Data

US 2009/0037569 A1 Feb. 5, 2009

(51) Int. Cl.
*G06F 15/173* (2006.01)
(52) U.S. Cl. ...................................... 709/201
(58) Field of Classification Search .................. 709/201, 709/205
See application file for complete search history.

(56) References Cited

U.S. PATENT DOCUMENTS

| | | | | |
|---|---|---|---|---|
| 5,974,392 | A * | 10/1999 | Endo | 705/8 |
| 6,418,462 | B1 * | 7/2002 | Xu | 709/201 |
| 6,711,607 | B1 * | 3/2004 | Goyal | 709/203 |
| 6,711,616 | B1 * | 3/2004 | Stamm et al. | 709/226 |
| 7,031,944 | B2 * | 4/2006 | Tanioka | 705/59 |
| 7,072,886 | B2 * | 7/2006 | Salmenkaita et al. | 707/4 |
| 7,103,628 | B2 * | 9/2006 | Neiman et al. | 709/201 |
| 7,111,300 | B1 * | 9/2006 | Salas et al. | 718/105 |
| 7,206,387 | B2 * | 4/2007 | Jan et al. | 379/88.01 |
| 7,243,121 | B2 * | 7/2007 | Neiman et al. | 709/201 |
| 7,254,607 | B2 * | 8/2007 | Hubbard et al. | 709/203 |
| 7,434,226 | B2 | 10/2008 | Singh | |
| 7,604,165 | B2 * | 10/2009 | Ramachandran | 235/379 |
| 2003/0087219 | A1 * | 5/2003 | Berger et al. | 434/118 |
| 2006/0161615 | A1 | 7/2006 | Brooks et al. | |
| 2006/0181391 | A1 | 8/2006 | McNeill et al. | |
| 2006/0259341 | A1 | 11/2006 | Fung et al. | |
| 2007/0011334 | A1 | 1/2007 | Higgins et al. | |
| 2007/0100829 | A1 * | 5/2007 | Allen et al. | 707/9 |

FOREIGN PATENT DOCUMENTS

WO WO 2007/050871 5/2007

OTHER PUBLICATIONS

E. James Whitehead, Jr. WEBDAV: IETF Standard for Collaborative Authoring on the Web, Sep. 1998, IEEE Internet Computing, pp. 34-40.*
PCT International Search Report PCT/EP2008/058653; Oct. 14, 2008.
PCT/EP2008/0586583, PCT Notification Concerning Transmittal of International Preliminary Report on Patentability, PCT International Preliminary Report on Patentability with PCT Written Opinion, Feb. 11, 2010. pp. 1-8.
US Office Action for U.S. Appl. No. 11/748,952, dated Apr. 30, 2010; pp. 1-17.
Amendment & Response to Office Action for U.S. Appl. No. 11/748,952, filed Jun. 10, 2010, pp. 1-10.

* cited by examiner

*Primary Examiner* — David Y Eng
(74) *Attorney, Agent, or Firm* — Marsh Fischman & Breyfogle LLP; Kent A. Lembke

(57) ABSTRACT

A computer implemented distributed workflow system includes a central server containing a management module and a datastore for storing workflow modules each having identifiable allocatable tasks requiring user input to complete. The management module is configured to define the workflow and manage the creation and distribution of the identifiable allocated tasks to one or more remote users, each having an associated handheld device and a locally stored application executable on the handheld device. Processing by the remote user of the identifiable allocated task is in response to a task initiation communication from the central server, which communicates with the remote handheld devices over a communications network. A user interface on the handheld device which facilitates data entry when the user completes the allocated task.

25 Claims, 6 Drawing Sheets

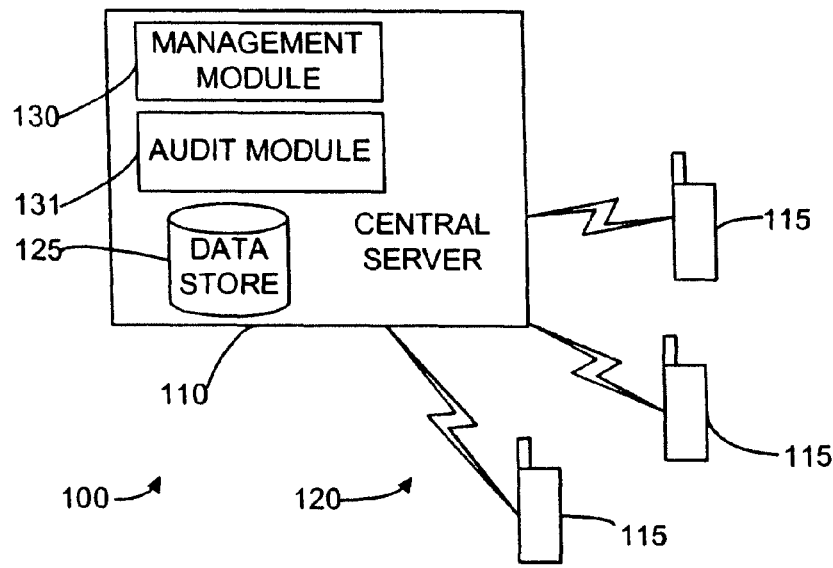
Figure 1
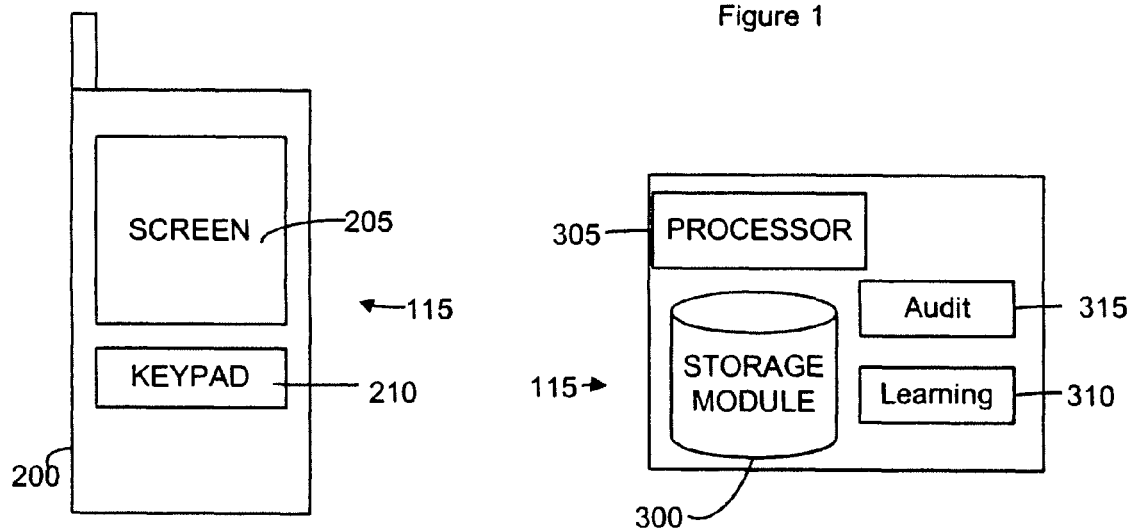
Figure 2
Figure 3

SYSTEM AND METHOD FOR PROVIDING A DISTRIBUTED WORKFLOW THROUGH A PLURALITY OF HANDHELD DEVICES

FIELD OF THE INVENTION

This invention relates generally to a system and method for enabling an implementation of a workflow sequence using a number of handheld devices. More particularly, the present invention relates to a system and method for enabling a two or more remotely located persons, each having a handheld device, to effectively implement a centralized workflow.

BACKGROUND OF THE INVENTION

Within any particular task or work schedule there is a process flow defining a number of steps that need to be implemented in a specific order to achieve the completed task. This sequence of steps may be considered a workflow and can be considered at its simplest the allocation and movement of individual tasks through the process in order to achieve the desired completed task. While some workflows may be completed by an individual, many others require the interaction between two or more persons—each being allocated a specific task for completion.

Within any specific workflow there is often a predefined order in which the individual tasks must be completed. Often it is not possible to initiate a task until the previous task has been successfully completed. In other workflows there is a possibility for multiple tasks to be conducted in parallel but each needs to be marked as completed before the overall workflow may be considered completed. Where two or more tasks within a workflow are allocated to different individuals there is a requirement for these individuals to coordinate with one another in order to achieve the necessary completion of the task. This can be achieved through a simple conversation between the two or through the use of computer implemented technologies which are configured to receive inputs from each of the individuals to coordinate the completion of each of the tasks.

Using such computer implemented technologies it is possible to automate much of a workflow. There is however still a difficulty where certain tasks require remote users to interact with one another. There is a further need to be able to audit these tasks. There is yet a further need to be able to ensure that the tasks completed are completed satisfactorily.

Therefore despite the advances in the field, there is still need of more efficient systems and methods for providing distributed workflows.

SUMMARY

These and other problems are addressed in accordance with the teaching of the present invention which provides a method and system for enabling an implementation of a workflow sequence using a number of handheld devices. These devices are operable by an operator of the device and using the teaching of the invention such that an operator may be provided with specific guidance through their handheld device as to how to complete a specific task at the time of the task. The invention further provides in certain implementations for an audit of the tasks conducted at selected ones of the handheld devices such that overall control of the performance of the workflow may be effected. A system provided in accordance with the teaching of the invention may also be configured to provide the delivery of just-in-time training on how to complete the task required for completion of the work task.

Such a system may be implemented in a variety of ways, including one or more computer programs which are storeable on a computer readable medium and which include computer logic which is executable on one or more handheld devices and which is configured to enable the handheld devices to interact with a central server so as to establish a remote overview of access to specific applications executed on the handheld device.

Other systems, methods, features, and advantages of the present invention will be, or will become, apparent to one having ordinary skill in the art upon examination of the following drawings and detailed description. It is intended that all such additional systems, methods, features, and advantages included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 1 is a graphical representation of a computer based workflow system in accordance with the teaching of the invention.

FIG. 2 is an example, in simplified form, of typical external components of a mobile handheld device for use with a system of the present invention.

FIG. 3 shows internal components of a device of FIG. 2

DETAILED DESCRIPTION

Figure 4:
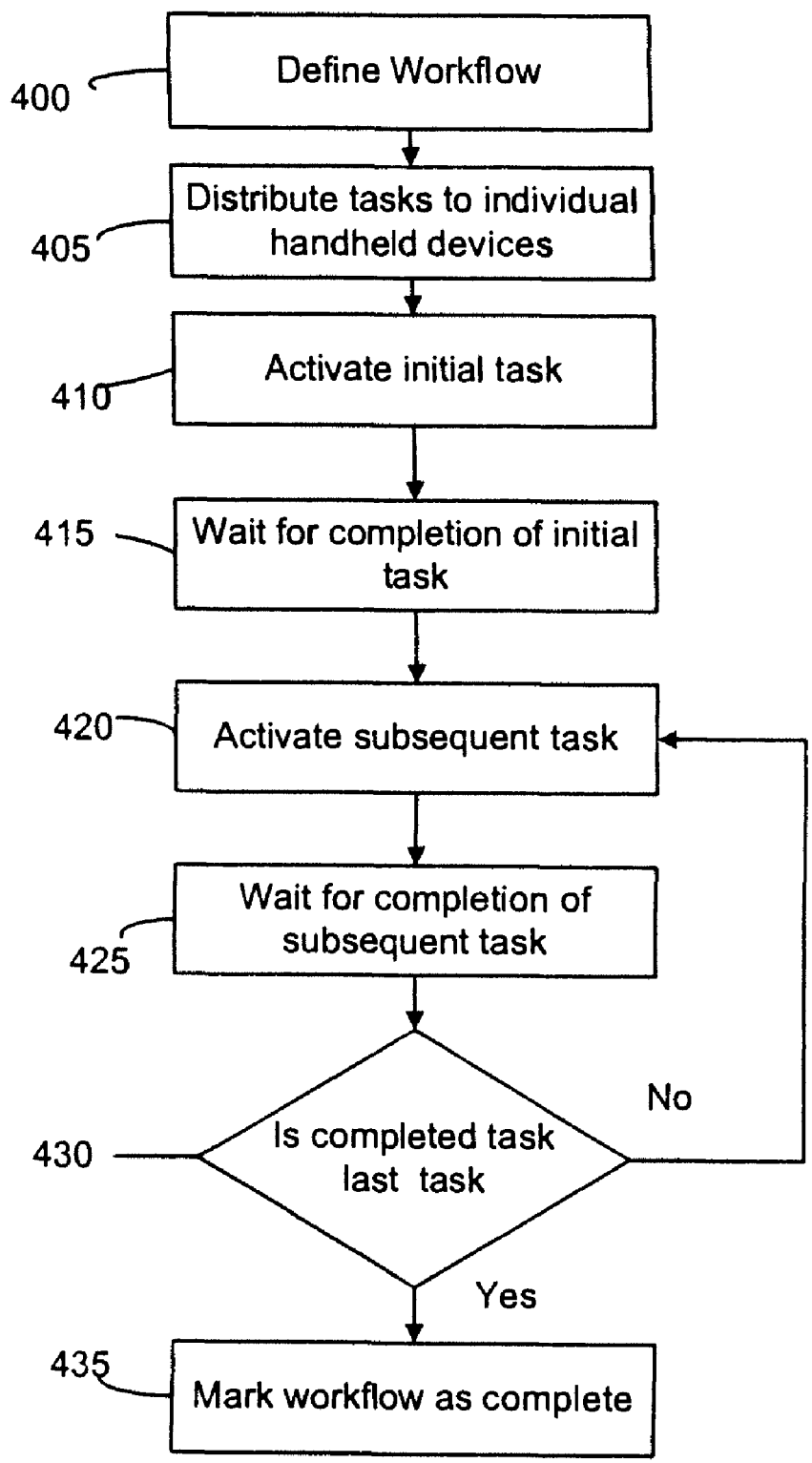
FIG. 4 shows in a flowchart how a workflow may by implemented by two or more remote users but controlled by a central server according to the teaching of the invention.

The invention will now be described with reference to exemplary embodiments which are provided to assist in an understanding of the teaching of the invention but are not to be construed as limiting the invention in any way except as may be deemed necessary in the light of the appended claims.

As shown in the schematic of FIG. 1, a system 100 according to the teaching of the invention includes a central server 110 which is configured to communicate with one or more remote handheld devices 115 over a communication network 120. Such a network is typically a wireless network providing data transfer protocols such as GPRS or 3G. The handheld devices may include such devices as personal digital assistants (PDAs), smartphones or ultra mobile pc's (UMPC) such as those manufactured and provided by Sony Ericsson™, Nokia™, Samsung™, Blackberry™, TabletKiosk™ or the like. Further examples of the handheld devices include those that are dedicated for specific tasks such as those manufactured and provided by Psion™ or Palm™ For the sake of convenience the invention will now be described with regard to an implementation on a generic mobile computing device, but it will be understood that this is purely exemplary of the type of device that could be used to implement the teaching of the invention. The server 110 desirably includes conventional computer architecture such as memory, processors, i/o devices and the like, as will be well appreciated by those skilled in the art. For the sake of clarity such conventional architecture components will be omitted from the following description. It will be further appreciated that while shown as a single entity that functionality of the central server could be distributed over two or more individual machines.

Within the server 110 is provided a management module 130 which is useable to administer the delivery and tracking of a number of workflow modules to definable handheld devices. The management module 130 is interfaceable with a datastore 125 which is configured to store specific elements of each of the workflows which are available for delivery to one or more of the handheld devices. The server 110 also includes an audit module 131 which is useable to provide an audit of the workflows coordinated by the management module. Such an audit function may be used to audit the overall workflow such as the time required to complete the task, bottlenecks within the system etc., or could use data transferable from individual handheld devices to provide a deeper level of analysis related to the activities performed on the individual handheld. Such a drilling down of the activities may be performed later as part of an audit function of the workflow.

As shown in FIG. 2 a typical handheld device 115 which is useful in implementing the teaching of the invention includes a body or casing 200 which defines the exterior perimeter of the device. A graphical user interface or screen 205 is provided, typically of the dimensions 320×240 pixels, but it will be understood that the screen size is not to be limited to such dimensions as it is for example known that screen sizes of up to 800×600 can be implemented within a handheld computing device environment. Such screen sizes are suitable for reading extended portions of text. To enable a user to interface with the device, a keypad 210 is typically provided. Depending on the features of the specific handheld device, this may include a QWERTY keypad, although the present invention is not to be limited to devices having such keypads. For example, the user may also or alternatively interface with the device through use of a stylus or other interface device. Such alternative means of interfacing with a handheld device will be well understood by the person skilled in the art and it is not intended to limit the present invention to any one specific interface.

Internally within the handheld device 115, is provided a processor 305 which is used to execute computer logic and a storage module 300 on which one or more workflow modules may be stored. The storage module may also be used to store specific courseware modules that may be activated through the tasks of the specific workflows to assist the user of the handheld device in operating the workflow. This aspect will be discussed in more detail below.

In accordance with the teaching of the invention, the handheld device 115 is provided with an executable application which enables the device to locally run one or more workflow modules, or individual tasks from a specific workflow. These modules may be pre-loaded on the handheld device or may be provided in a periodic fashion to the handheld device through an interface of the device 115 with the server 110 through some form of connection, wirelessly or physically. When the device is executing a specific task it is desirably operating in a standalone mode, not requiring interaction with the central server. In this way the device can be used in performing a specific task in locations where communication signals are low and it is not possible to effect a communication with the central server. Once the task has been completed, the device may then communicate notification of that completion back to the central server. Such notification can be achieved by docking the device with a physical communication port or achieving a wireless signal capable of enabling communication between the server and the handheld device.

In order to initially configure the device for use with a system of the present invention it is necessary to first enable an installation of an executable application on the handheld device. Such an application may be provided as a series of computer executable files such as those implemented in Java™ code. Where the application is deployed over a mobile data network it is desirable that the physical size of files be kept to a minimum and by using Java it is possible to provide an executable application of the order of about 150 kb but it will be understood that it is not intended to limit the implementation of the teaching of the invention to any one size of computer application. Where the bandwidth of the communication with the device is not a limiting factor the application may be provided in other formats.

The system architecture of the present invention is useful in implementing a workflow where the workflow is completed through a processing of individual tasks within the workflow by two or more remotely located users.

FIG. 4 shows an example of how a workflow may be completed using an architecture according to the teaching of the invention. This process flow is defined from the perspective of the central server. There is an initial definition of a workflow (Step 400). Such a definition, which is desirably effected within the management module 130, will include the identification of specific tasks within the workflow and to whom those tasks should be provided. Where the workflow requires the completion of a first task prior to the instigation of a second task, such ordering will be included within the definition of the workflow. Once a workflow has been defined it may be stored in the storage module 125 of the server 110. Once a workflow has been defined the individual tasks may then be distributed to appropriate handheld devices depending on who has been allocated the task within the workflow (Step 405). The identification of an appropriate handheld device may make use of a predefined relationship between handheld device identifiers and specific users or categories of users within the system.

Once tasks have been allocated, it is then possible to subsequently activate a workflow. Such activation may happen once or if the workflow represents a repeat task, may be activated a number of times—each time to achieve the completion of the process represented by the workflow. The activation of a work flow includes the transmission of a message from the central server to the appropriate handheld device which is associated with the first task of the workflow (Step 410). The server then operates in a waiting mode, until it receives a response communication from the handheld device that the task has been completed (Step 415). On receipt of that confirmation, the management module determines the appropriate next task and activates that task through transmission of a message to the appropriate handheld device associated with that next task (Step 420). The server then returns to the wait mode and awaits confirmation of that task (Step 425).

On receipt of confirmation of the completed task, the management module then ascertains whether the completed task represents the last task within the process of the workflow (Step 430). If it is, then workflow is marked as completed (Step 435), if it is not, then a subsequent associated task is activated (Step 420). The process is iterated until all defined tasks are marked as completed.

Figure 5:
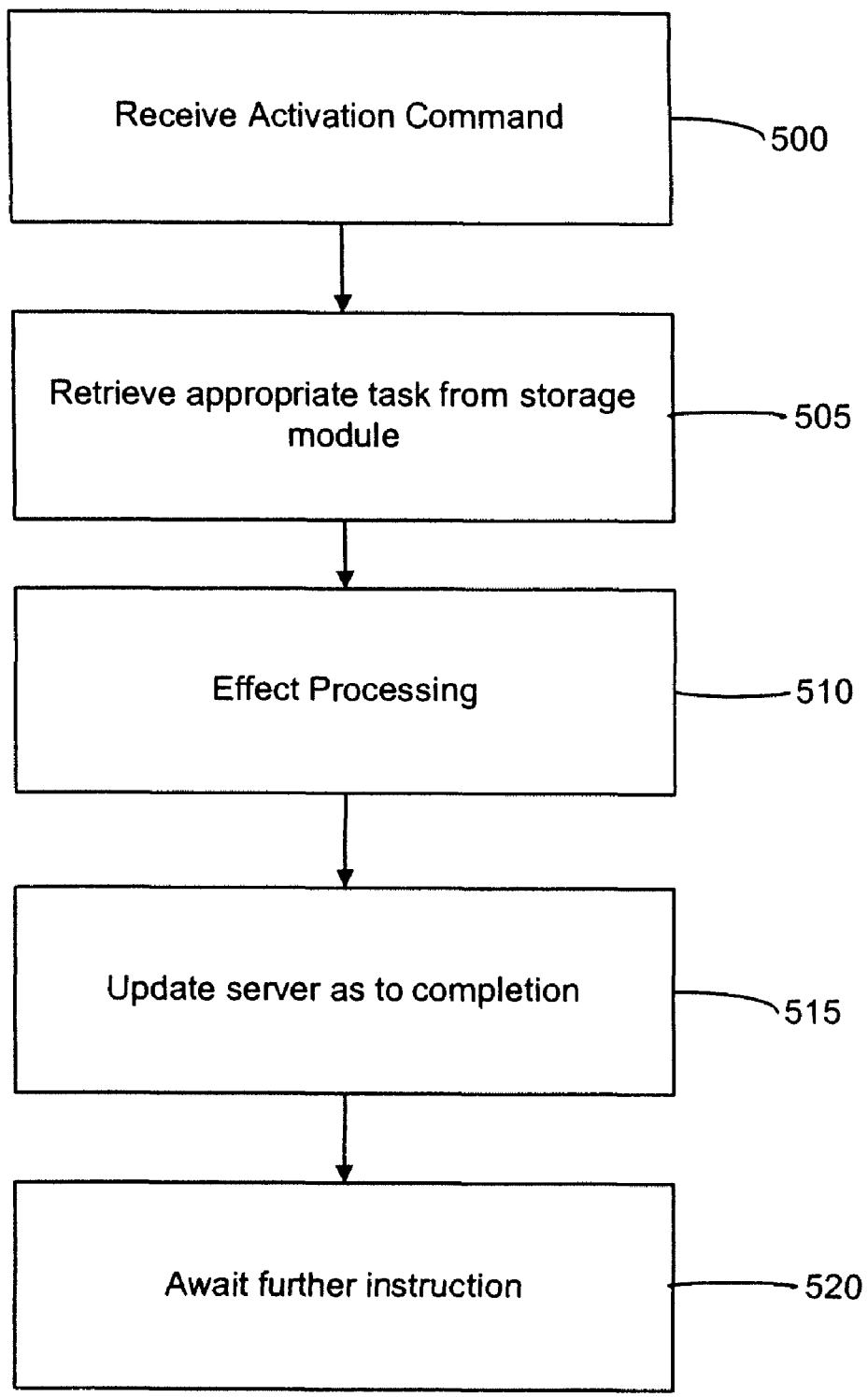
FIG. 5 shows in a flowchart how specific tasks of a workflow may be processed on a handheld device according to the teaching of the invention.

FIG. 5 shows how tasks that have allocated to a specific handheld device may be processed on that handheld device. Arising from the distribution of the individual tasks to the handheld device (Step 405 of FIG. 4), the handheld device is configured to store that task as an executable application that may be run locally on that handheld device. The task is desirably stored within the storage module 300 of the handheld device. On receipt of an activation command from the central server (Step 500), the handheld device is configured to effect retrieval from the storage module (Step 505) and a processing (Step 510) of the appropriate task. Each task may have one or more steps associated with it, and the processing of the task may require user input to the handheld device to update the task flow that a particular step has been completed. Once all steps associated with the task have been completed, the handheld device is configured to effect an updating of that completion to the remote central server (Step 515). This will involve a transmission of a data message from the handheld device to the central server using one or more known data transmission protocols. Once the central server has been updated, the handheld device resumes a waiting configuration, where it will remain until receipt of a subsequent activation command is received from the server.

It will be understood that while the handheld device is configured to communicate with the central server at specific instances, that during its period of operation of the specific allocated tasks it is operable in a standalone mode—i.e. the computing resources of the handheld device are sufficient to enable an execution and processing of the appropriate tasks without requiring recourse to the central server.

According to the teaching of an embodiment of the invention, datastores of particular ones of the handheld devices may be populated with a learning module provided to assist the user of the handheld device in performance of the allocated task. In this arrangement a distance learning environment is created whereby the user of the handheld device may consult a learning module locally stored within their handheld device with regard to instruction as to how to complete a particular task. The provision of learning at the time of the task is particularly advantageous in that the user is provided with "just in time" learning—their completion of a task accurately does not require the recollection of the task from a previous learning activity which may be imperfect recollection. Rather they may consult the learning module at the time of learning to achieve the necessary skillset to complete the task required accurately.

Figure 6:
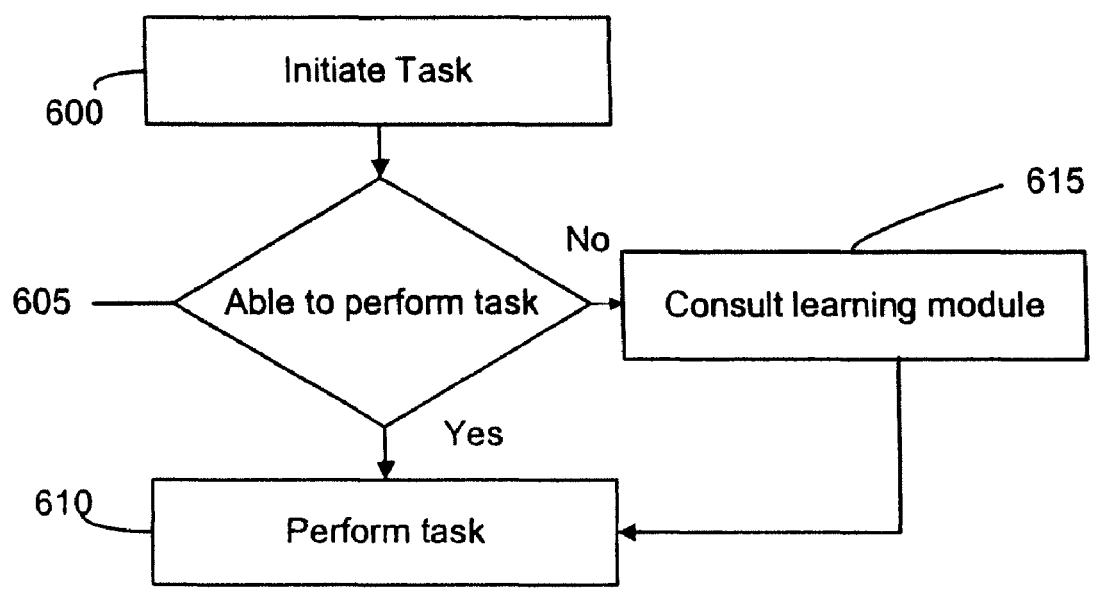
FIG. 6 shows in a flow chart how the user performing a task of FIG. 5 may be provided with access to a locally executable learning module.

FIG. 6 shows in schematic flow how such a learning activity could be conducted by a user of a handheld device. This process flow will typically occur within the time frame defined by the functional block 510 of FIG. 5, the processing of the allocated task. Once the task has been initiated (Step 600) the user will be prompted via the graphical user interface of the handheld device whether they possess the appropriate knowledge necessary to perform the allocated task (Step 605). If they respond in the positive, then they simply proceed to perform the allocated task (Step 610). If they respond in the negative, then they are prompted to consult the learning module which is locally stored and executed on the handheld device (Step 615). Once they have accessed the tuition provided by the learning module it is then possible for the user to complete the task. The benefit of the local and direct access to the learning module is that the user's knowledge of how to complete the allocated task is fresh in their mind at the time of conducting the task. Where the task includes multiple steps, it will be appreciated that the user may be able to access the learning module for one or more of these steps during the process flow. In this example they may know how to perform 75% of the task but need to consult the learning module for assistance in the other 25% of the task.

It will be understood that the provision of such distance learning requires an intelligent local handheld device which is operable to store and process the individual learning modules. This requires the installation of a local application capable of performing the necessary processing and the local storage of one or more learning module files.

Figure 7:
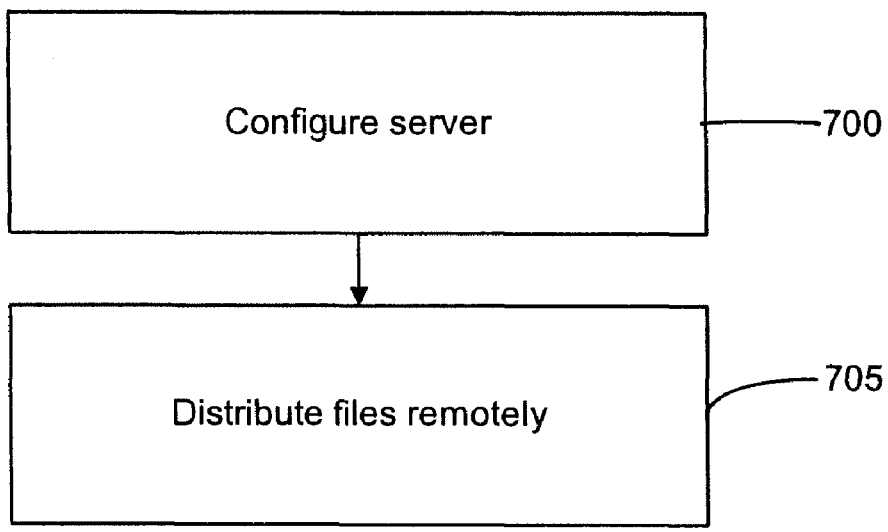
FIG. 7 shows a flow sequence for distributing files to the handheld device according to a first deployment route.

In order to effect a system providing distance learning to one or more users it is possible to push the necessary local application to each of the users or alternatively to enable the users to individually pull the application down from a central site as required. FIG. 7 shows a first arrangement for facilitating such an interface, that of a push arrangement. As shown in FIG. 7 such an arrangement may leverage off conventional technology such as that provided by wireless platforms that provide a centralized depot of information that may be selectively pushed to one or more nominated users. Using such an architecture, the invention teaches putting the relevant application files onto a learning platform and then selecting users who should receive these files (Step 700). The learning platform could be co-located with the central server or provided as a separate component within the system architecture. Once this is defined the learning platform will effect a distribution of the relevant files to each of the selected users (Step 705). Such a process will appear seamless to the user of the handheld device and requires no interaction by them with the central server. If the distribution is over a wireless network it will be appreciated that the bandwidth available will determine the transmission times and is normally of a longer duration than if the handheld devices are coupled to the learning platform via a fixed wired link.

Figure 8:
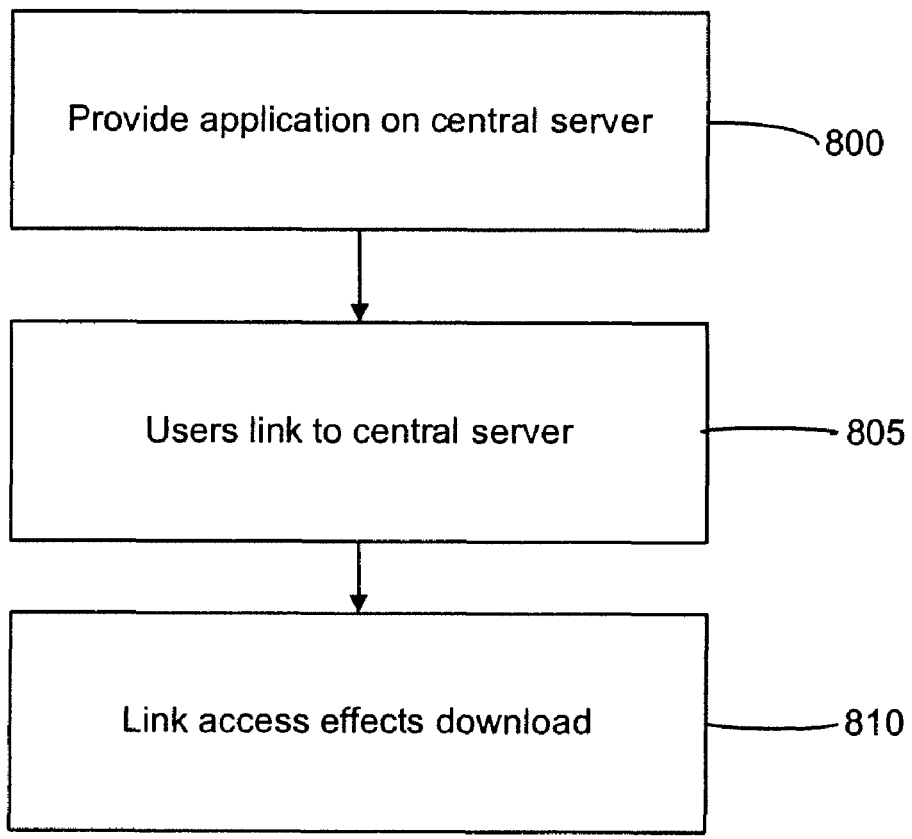
FIG. 8 shows in a flowchart a second deployment route for providing the handheld device with functionality according to the teaching of the invention.

In an alternative arrangement, shown in FIG. 8, the user is required to pull the application from a central server. In a first step, the network administrator provides the application on the central server 110, (Step 800). The user may then actively link to this server for example using a web browser provided on their handheld device (Step 805). The access to the site effects a download of the application (Step 810). This may require device specific permissions on the local handheld device to be correctly set to enable the application to download and courses to run correctly.

Figure 9:
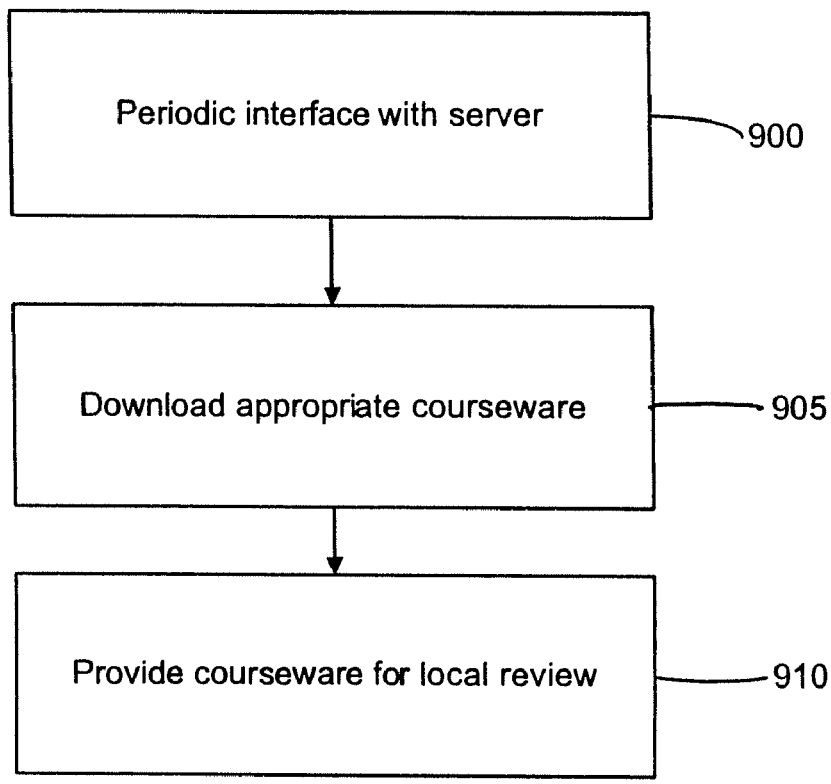
FIG. 9 shows in a flowchart sequence how a user may access courseware on their mobile device.

FIG. 9 shows how a handheld device, once suitably configured to installation of the local executable computer program may be used to deliver coursework to the user of the device. Once installed, the local learning application 310 (shown in FIG. 3) is configurable to periodically access the central server 110 to effect a download of the actual coursework that has been defined for distribution to the specific handheld device (Step 900). This interface may be effected through a communication initiated by the handheld device or through one initiated by the central server. In the former arrangement, the application may be set to poll for courses and download them periodically or the user can manually interface with the server to determine whether there are appropriate courses for that user to review. It is desirable that the courses be provided in compressed format such as a zip file and also that they are standards compliant e.g. that defined under the SCORM protocol. In all cases once an appropriate set of courses are determined these are downloaded to the local handheld device (Step 905). By having this periodic update of the learning module, it is possible to update the users of the handheld devices with new procedures as to how to complete an allocated task.

These coursework modules are then selectable by a local user who accesses these as desired and then completes them at a time dictated by the user (Step 910), typically at the time of processing the task, but of course the user could select to complete a learning task at other times that are more convenient. As the coursework is locally stored on each handheld, this interaction does not require connectivity with the remote server. In this way as the system provides a standalone fully self consistent local application, the user may access and complete coursework at times and locations where connectivity is not available such as for example in regions of low data network coverage.

Figure 10:
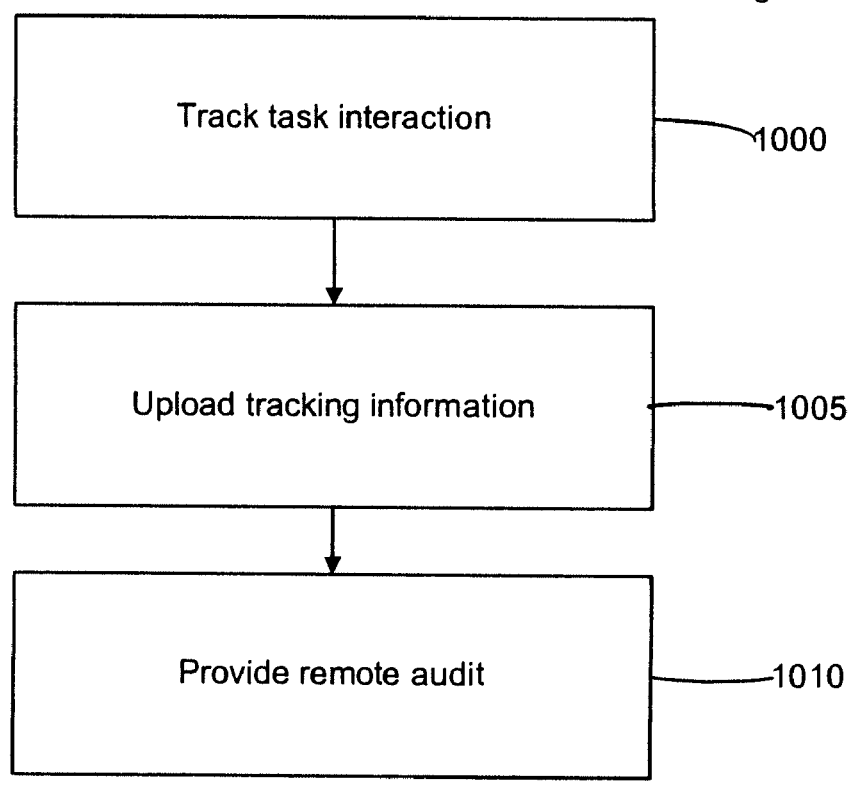
FIG. 10 shows in a flowchart sequence how the handheld device may be configured to update the remote server as to the status of tasks conducted on the handheld device.

To ensure that the allocated tasks that are conducted at each of the local handheld devices are completed satisfactorily, the handheld device preferably includes a local audit application 315 (FIG. 3) which includes a tracking function which is configured to track and log the user interaction with the handheld device during the performance of a task. As shown in FIG. 10, the audit function is typically activated on activation of a specific task (Step 1000). Information or tracking data that may be stored includes the time taken to complete a task and whether any specific learning module was activated or consulted during the performance of the task. This tracking data can then be automatically uploaded to the central server—to a centralized audit module 131 provided thereon—(Step 1005). The tracking information is useful as it allows the remote administrator of the workflow to ensure that each of the remote parties are adequately completing their designated tasks (Step 1010). This can be used to effect a triggering of subsequent courses for delivery to a user, to perform performance appraisals as to a user's performance of their task or to provide an audit for later verification that a task was completed satisfactorily. It is desirable that the tracking module is configured to be standards compliant e.g. SCORM, to ensure that the information is transmitted in a universally recognizable fashion.

A system in accordance with the teaching of the invention provides a number of distinct advantages in implementation of workflows. By separating the workflow into a number of distinct tasks and then allocating individual ones of the task to designated personnel while maintaining a centralized control of the overall workflow it is possible to ensure that task are performed to a schedule and to analyse weaknesses within the workflow. By providing a learning module with which a user can locally interact at the time of performance of their task it is possible to ensure that the person performing the task is familiar with the correct procedures as to how to perform the task. Furthermore by tracking the user interaction with their handheld device during performance of their task it is possible to provide an audit of the workflow process flow to ensure that necessary guidelines have been adhered to and that any weaknesses in the system are easily identified. When a weakness is identified it is possible to provide new and personalized learning courseware on a per user basis on a push from the server, or indeed on a pull from the remote client. This does not require a continuous or synchronous link between the two, in that the information can be transferred between the client handheld devices and the server during times of connectivity and does not require an always up link between the two. In this way, the system may operate in environments where only intermittent communication between the server and handheld devices is possible.

Such an architecture is desirable for a number of different reasons and environments. For example in providing workflow in environments such as airports or hospitals where it is not always possible to ensure that a handheld device will maintain continuous communication with a centralized server it is possible to activate tasks for specific individuals during times of connectivity and then receive confirmation of completion of those tasks during subsequent periods of connectivity without requiring continuous connectivity between the two times. By using the centralized server to control the activation of subsequent steps within the workflow sequence it is possible to manage a number of users who are remotely located relative to one another and control the workflow sequence in an auditable fashion. In this way, each user is responsible for their task or portion of the work flow, and the central system ensures that these individual tasks cumulatively achieve the overall outcome. The central management system will manage through a monitoring all tasks and may be configured to provide an alert when any task or process falls out of compliance.

By providing the courseware in a format that is SCORM or some other similar standard compliant it is possible to generate courseware for a traditional elearning environment where there are larger format screens etc, and then transpose that courseware to an mlearning environment through use of the in built functionality that is present in many mobile devices for viewing for example internet web sites or the like. Many of the browsers that are provided on a mobile handheld device are capable of effecting changes in the format of the viewed material to ensure that it can be viewed sensibly on a much smaller screen that what it was intended for. By providing a distributed learning environment, it will be understood that the level of distribution can be scaled depending on the specifics of the deployment. By associating users with an identity and the courses that they have completed it is possible for management to centrally monitor both compliance with levels of learning required within a specific work environment and also to provide information as appropriate to selected ones of their workforce through a push model.

It will be understood that a system in accordance with the teaching of the invention uses functionality residing on traditional handheld devices such as i/o devices, screens, browser applications etc., but interfaces these with a workflow application that provides locally accessible coursework that is monitored and tracked locally. This local application is then interfaceable with a remote server to provide the remote server with an update of the local user progress through a defined task list. By separating the software that is used to run the task from the task itself, it is possible on installation of the software to provide the user with a personalized task listing depending on their specific work environment. By including a tracking module such as a background listener which is executable and runs in the background, it is possible to monitor the usage and provide details to the central server. There can be many individuals or teams completing individual tasks. There can also be many different workflows or procedures defined resulting in a potentially very complex network of users and actions. The distributed model as discussed here simplifies this for each individual user as they only need to know about their own tasks and responsibilities. The system will typically work on the principle of 'every chain is as strong as the weakest link'. By defining the work flow allocated to a specific handheld device, we are defining each link and distributing each link where the chain is. There is a knock on effect of any individual not completing their duties, and this will be prevented where possible through alerts and generated warnings. In the event of a breach or failure of the workflow, the central system will help to reassign tasks and minimize disruption as appropriate. This could be achieved for example by having a primary task responsibility with a fall back responsibility defined within the workflow where the primary task fails to indicate completion of the task.

By implementing audit and management of the workflow remotely from the users of the handheld devices it is possible to provide improved levels of safety into workflows. For example in a secure environment such as an airport collusion between parties cannot be used to indicate completion of a workflow before actual completion is effected. It is possible to define certain time periods for completion of a task and if that task is not confirmed back to the central server within a prescribed multiple of that predefined time period, then the task can be flagged for further monitoring or intervention. Furthermore it is possible using the teaching of the invention to facilitate testing of the individuals during their completion of their specific work tasks. For example certain workflows could require a user to input data that is representative of their physical performance at that time and that data would be transmitted back to the central server for assessment prior to activating a second package within the overall workflow. Such an implementation could be especially useful in testing for alcohol or drug abuse in persons whose sobriety is essential for their work task—such as the operators of machinery or vehicles. By configuring the handheld device to include a user interface whereby the user may for example provide a breathalyzer sample, it is possible to test for presence of alcohol. If such is tested, and the positive affirmation is effected at the central server, the subsequent steps could be cancelled thereby preventing conclusion of a workflow in an unsafe environment. Such an application is particularly useful for transport operators such as train or bus vehicles where as part of the distributed workflow the driver would have to indicate sobriety. If he failed, then steps such as cancellation of the trip could be implemented.

It will be understood that what has been described herein are exemplary arrangements of a workflow environment where multiple users are allocated tasks within the workflow but overall management of the workflow is effected centrally. By providing a ping-pong environment where interactions between a central server management module and individual ones of the distributed handheld devices are used to control the process flow of the workflow it is possible to provide a highly audited arrangement. As individual tasks within the workflow require the completion of preceding tasks and these are monitored centrally it is possible to more securely manage the sequence of steps within the workflow. Furthermore as individual handheld device may include a learning module therein, it is possible to provide "just-in-time" training— training specific to a task at the time of the task. Such workflow management has been described with reference to a central server which is configured to communicate with two or more handheld computing devices to effect a delivery of specific work tasks to users of the respective handheld devices. By maintaining an interface with the handheld devices it is possible to coordinate and control performance of specific tasks within the workflow environment.

Any process descriptions or blocks in figures, such as those in the accompanying Figures, should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

At least the following is claimed:

1. A computer implemented distributed workflow system including:
   a. a central server having provided thereon a management module and a datastore configured to store a plurality of tasks collectively defining a workflow, individual ones of the plurality of tasks being allocatable for execution by one or more remote users, each of the remote users having an associated handheld device, the management module being configured to define the workflow in which completion of a first identifiable, allocatable task is required prior to the instigation of a second identifiable, allocatable task, the management module being further configured to manage creation and distribution of one or more of the identifiable allocated tasks of the workflow to the associated handheld device of the respective users,
   b. a locally stored application executable on the handheld device of the remote user and configured to enable execution by the remote user of the identifiable allocated task in response to a task initiation communication from the central server, wherein the central server and the plurality of remote handheld devices are operative for communicating over a communications network; and
   c. a tracking module having components provided on each of the central server and the local handheld device, the tracking module component on the local handheld device being configured to track user interaction with the handheld device regarding completion of the identifiable allocated task by the remote user or completion of one or more steps of the identifiable allocated task by the remote user and to periodically provide that information to the corresponding tracking module component on the central server, wherein the information provided by the tracking component on the handheld device to the tracking component on the central server effects a triggering for the transmission of a further task over the wireless communication network to one or more of the handheld devices associated with the respective users.

2. The system as claimed in claim 1, wherein courseware that may be activated to assist the user of the handheld device in performance of tasks is installed on the one or more handheld devices to as to be available to the one or more of the defined remote users.

3. The system as claimed in claim 1 further including a learning module executable on the handheld device, the learning module providing assistance selected from the group consisting of guidance, support, and instructions to a user of the handheld device to complete the allocated task.

4. The system of claim 1 wherein the central server and at least selected ones of the handheld devices are configured to communicate with each other over a communication network selected from the group consisting of a wireless communication network and a wired communication network.

5. The system of claim 1 wherein the central server is configured to define a sequential listing of tasks within the workflow such that individual tasks within the workflow require a completion of a previous task prior to activation.

6. The system of claim 5 wherein the management module is configured, on initiation of a task initiation communication to a selected handheld device to monitor for receipt of a communication from that selected handheld device confirming completion of that allocated task.

7. The system of claim 6 wherein the management module is configured in a manner selected from the group consisting of (i) to periodically effect a communication with the selected handheld device to monitor progress of that allocated task, (ii) to effect a task initiation communication for a second subsequent task within the workflow to a second handheld device on receipt of a communication confirming completion of an allocated task from a first handheld device, and (iii) to define an allocated time for completion of a task.

8. The system of claim 7, when the manner of the management module configuration is selection (iii), wherein on expiry of an allocated time without receiving a communication confirming completion of a task, the management module is configured to effect a task initiation command for a second alternative task to a second alternative handheld device.

9. The system of claim 1 wherein the handheld device is configured on receipt of the task initiation communication to activate a task operation module locally on the handheld device, the task operation module effecting generation on a user interface of instructions as to the nature of the task to the user of the handheld device.

10. The system of claim 9 wherein on display of the instructions, the handheld device is configured to receive user inputs pertaining to the task in response to the displayed instructions.

11. The system of claim 9 wherein the handheld device is configured to operate independently of the central server during activation of the task operation module.

12. The system of claim 9 wherein the generation of instructions on the user interface effects a request for a user to input data pertaining to their physical condition.

13. The system of claim 12 wherein the handheld device includes an interface for measuring blood alcohol levels, the handheld device being configured to effect a transmittal of received data pertaining to blood alcohol levels to the central server on receipt of same.

14. The system of claim 13 wherein the central server is configured on receipt of the data pertaining to blood alcohol levels to effect a determination as to whether to terminate the workflow.

15. The system of claim 3 wherein the learning module is configured to provide just in time learning to a user so as to assist the user in performing a task at the time of conducting the task.

16. The system of claim 15 wherein the handheld device is configured to monitor user interaction with the learning module and to provide data representative of that interaction to the central server.

17. The system of claim 1 wherein the workflow comprises individual tasks allocated to two or more remote users, and the system is configured to prevent execution of a task by a user in the absence of an authorization resultant from a completion of an earlier task in the workflow by another user.

18. The system of claim 17 wherein the management module is configured to effect control of the allocation of task to each of the remote users.

19. The system of claim 18 wherein the management module and the handheld devices communicate to effect control of the workflow.

20. The system of claim 18 wherein the management module is configured to locally store an identification of how tasks within the workflow have been allocated and to effect a monitoring of completion of those tasks by associated respective users.

21. The system of claim 20 wherein the management module is configured to store a hierarchy of tasks within the workflow.

22. The system of claim 21 wherein the hierarchy is based on a sequential allocation of tasks.

23. A computer implemented method of managing a workflow within a distributed computing environment, the method including:
a. defining a workflow of tasks such that completion of a first task is required prior to the instigation of a second task,
b. distributing specific tasks within the defined workflow to distributed handheld computing devices, the distribution effecting a storage on a handheld computing device associated with individual users of the distributed entities of data pertaining to respective specific tasks,
c. effecting an activation of an initial task by providing a data communication from a central server over a communications network to an identified handheld computing device associated with an individual user who is designated to execute that specific task,
d. monitoring for completion of that task by the individual user based on input by the individual user to the handheld computing device, forwarding information based on the input from the handheld computing device to the central server that the initial task was completed, and
e. on determining completion of that task by the central server, triggering a transmission from the central server of a further task, for completion by another user, over the communications network to a handheld computer device associated with that other user.

24. The method of claim 23 including a step selected from the group consisting of (i) a providing to selected ones of the distributed entities of information pertaining to the task allocated to that entity, and (ii) creating a performance rating for selected ones of the distributed entities based on a tracking of their completion of respective specific tasks.

25. The method of claim 24 wherein the information pertains to a learning module which is packaged as an executable file which is locally runnable on the handheld device of the entity.

* * * * *